United States Patent
Togashi et al.

[11] Patent Number: 5,295,741
[45] Date of Patent: Mar. 22, 1994

[54] CORE BAR FOR RUBBER TRACK AND RUBBER TRACK TRAVELING DEVICE

[75] Inventors: Sumio Togashi, Chigasaki; Tateo Muramatsu, Yokohama; Harumichi Yamazaki, Tokyo, all of Japan

[73] Assignee: Bridgestone Corporation, Tokyo, Japan

[21] Appl. No.: 827,001

[22] Filed: Jan. 28, 1992

[30] Foreign Application Priority Data

Jan. 30, 1991 [JP] Japan ................. 3-029555
Jun. 12, 1991 [JP] Japan ................. 3-168704
Dec. 16, 1991 [JP] Japan ................. 3-353241

[51] Int. Cl.⁵ .................................. B62D 55/26
[52] U.S. Cl. ........................ 305/38; 305/35 EB; 305/57
[58] Field of Search ............ 305/35 R, 35 EB, 38, 305/39, 56, 57, 24

[56] References Cited

U.S. PATENT DOCUMENTS

| | | | |
|---|---|---|---|
| 3,756,668 | 9/1973 | Russ, Sr. | |
| 4,904,030 | 2/1990 | Ono | 305/35 EB |
| 4,948,201 | 8/1990 | Furuta | 305/24 X |

FOREIGN PATENT DOCUMENTS

| | | |
|---|---|---|
| 0300488 | 1/1989 | European Pat. Off. |
| 0334326 | 9/1989 | European Pat. Off. |
| 59-106378 | 6/1984 | Japan |
| 61-18577 | 1/1986 | Japan |
| 63-171291 | 11/1988 | Japan |
| 0212675 | 8/1989 | Japan ................. 305/56 |
| 0266080 | 10/1989 | Japan ................. 305/35 R |
| 0031985 | 2/1990 | Japan ................. 305/35 EB |
| 0041989 | 2/1990 | Japan ................. 305/35 EB |
| 0070687 | 3/1991 | Japan ................. 305/35 EB |
| 2164616 | 3/1986 | United Kingdom |
| 9000488 | 1/1990 | World Int. Prop. O. ........ 305/24 |

*Primary Examiner*—Russell D. Stormer
*Attorney, Agent, or Firm*—Sughrue, Mion, Zinn, Macpeak & Seas

[57] ABSTRACT

A core bar for a rubber track includes wings on both sides to be embedded in an elastic member of the rubber track, a bridging center for connecting the wings, and driving protrusions provided on both sides of the bridging center and projecting from the inner circumferential surface of the rubber track. The bridging center has at least one projection projecting from the wings in a longitudinal direction of the rubber track. Projections of the core bars embedded in the elastic member overlap with each other to form a continuous passage for a track roller. As an alternative, the core bar includes a driving center protrusion provided at the center of the core bar and adapted to engage a sprocket wheel for driving the rubber track and track roller traveling surfaces extending along the driving center protrusion on both sides thereof. Sprockets for driving the rubber track is formed in the circumference with opened recesses alternately positioned in its both surfaces and engaged with the driving center protrusions of the core bars.

13 Claims, 18 Drawing Sheets

FIG_1
PRIOR ART
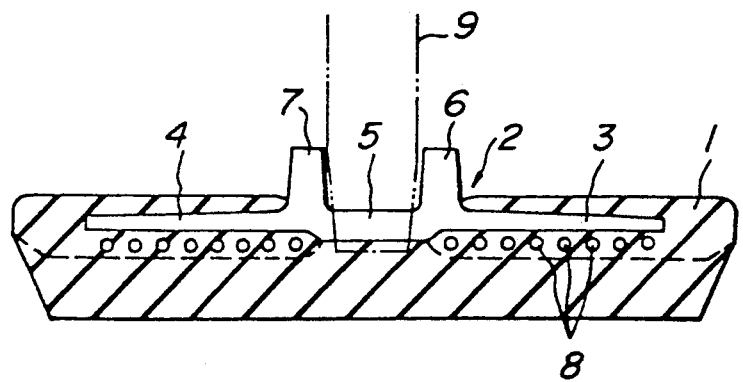
FIG_2
PRIOR ART
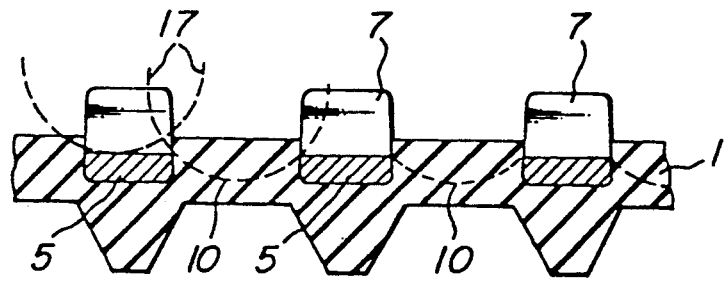

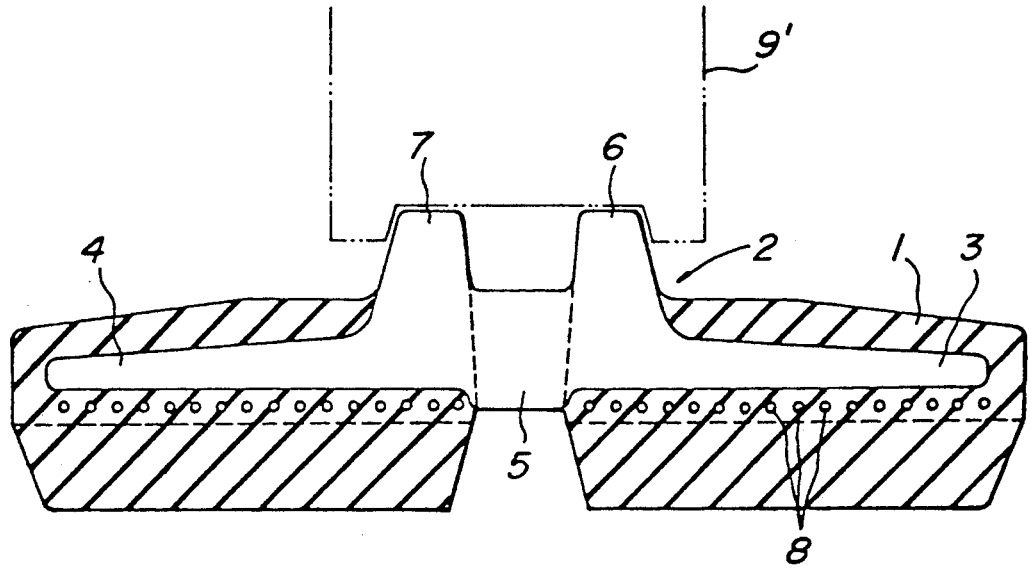
FIG_3
PRIOR ART

FIG_4
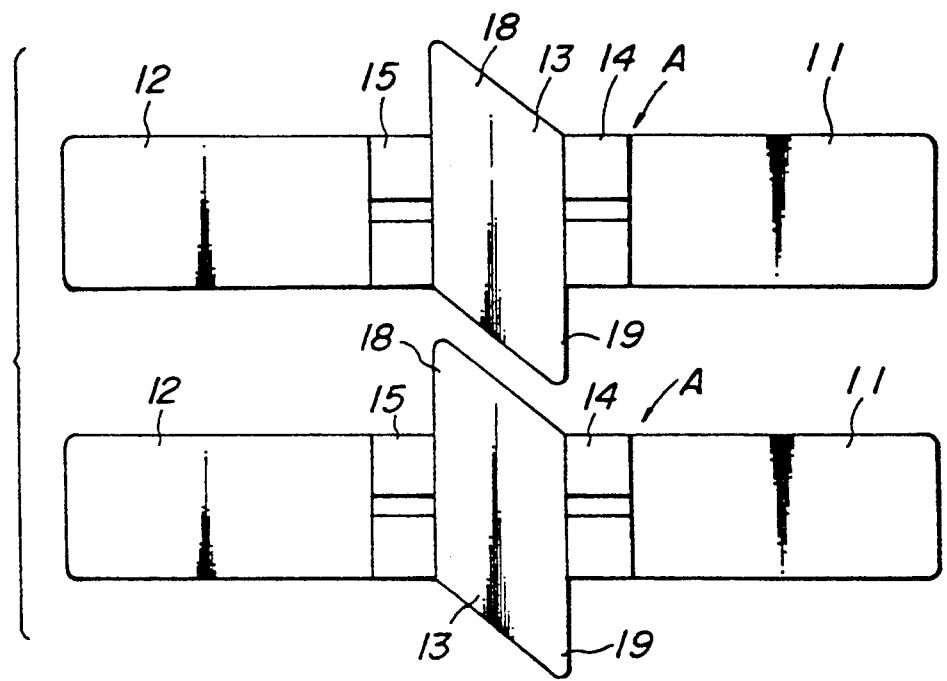
FIG_5
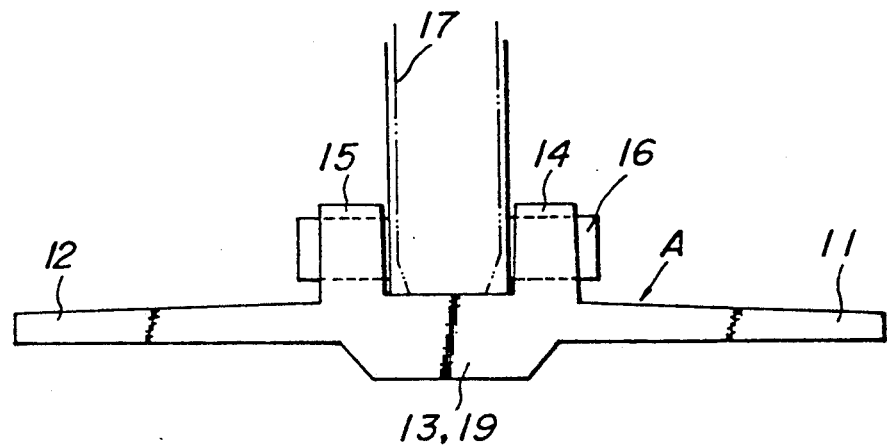

FIG_6
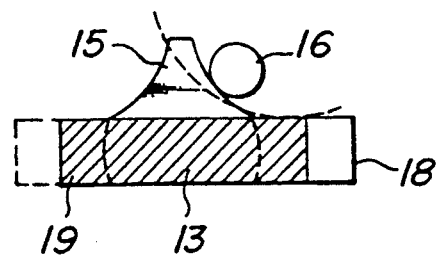
FIG_7
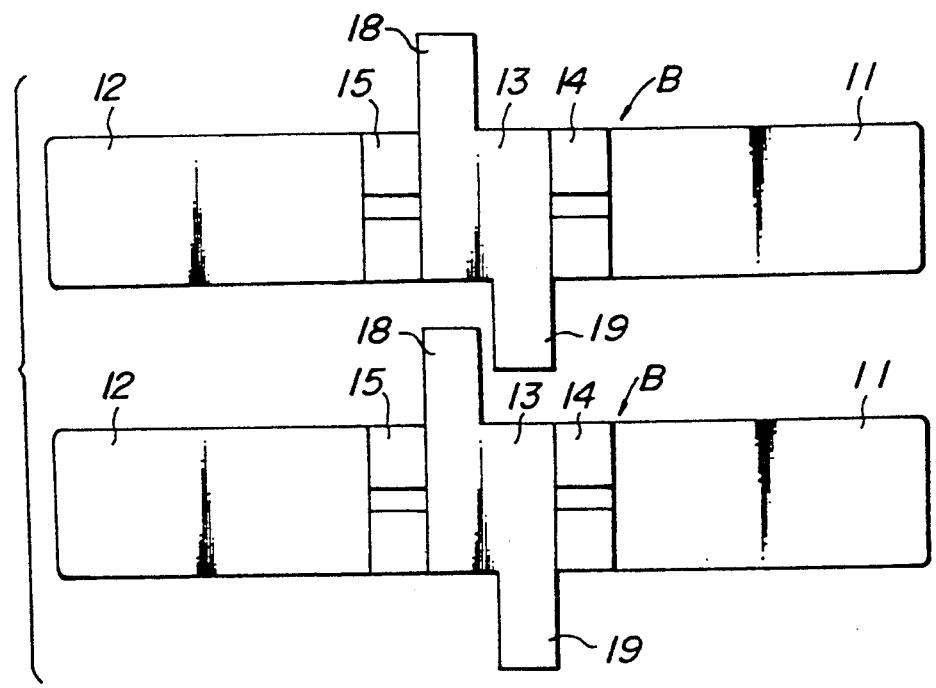

FIG_8
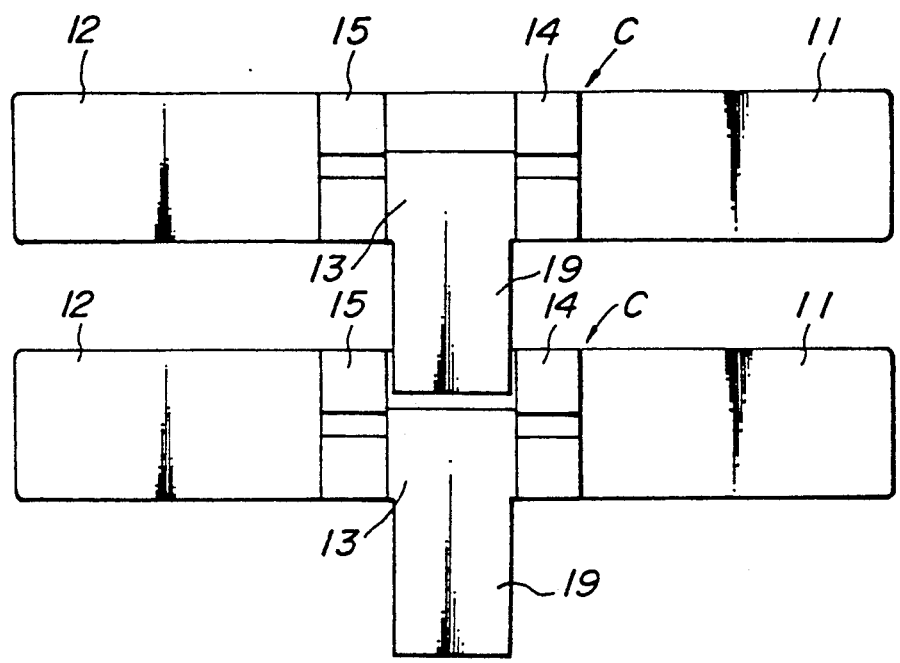
FIG_9
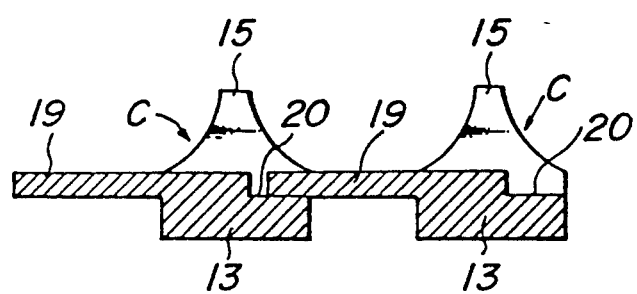

FIG_10
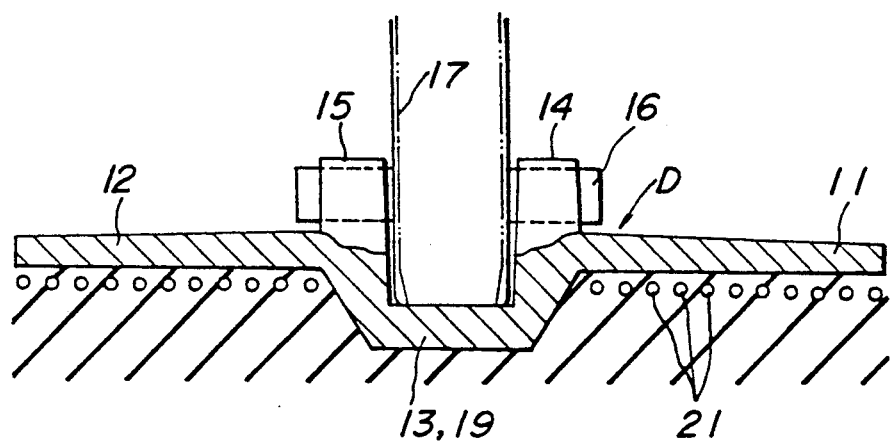
FIG_11
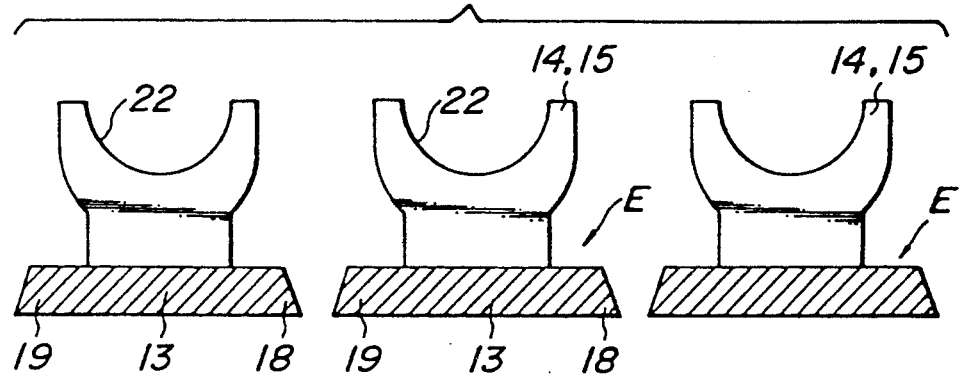

FIG_12
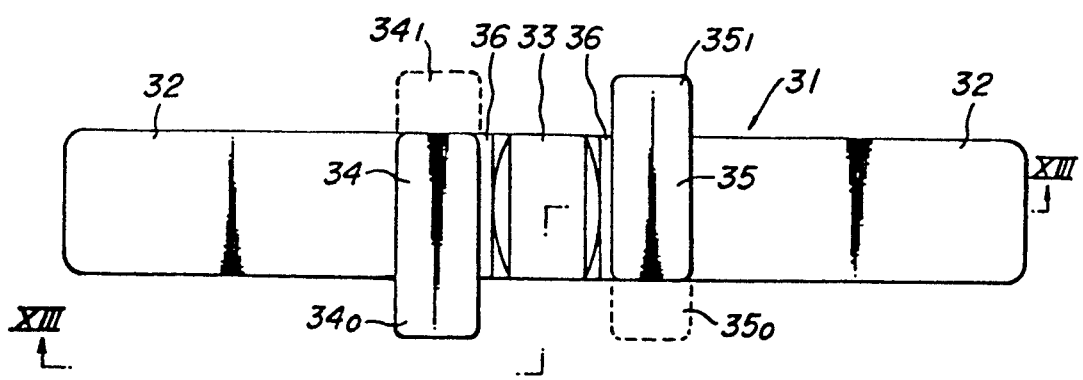
FIG_13
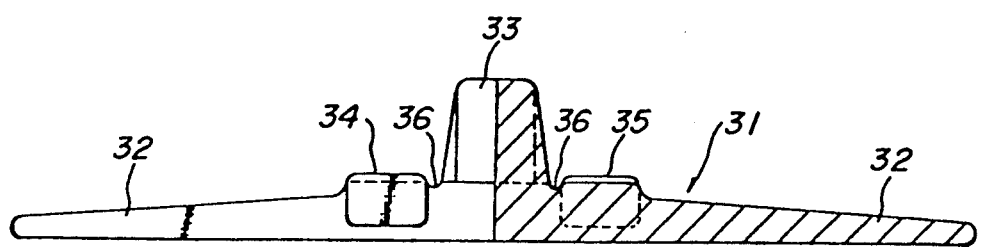

FIG._14
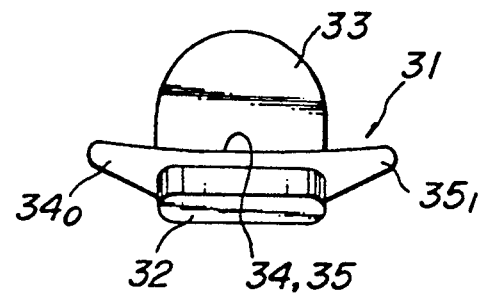
FIG._15
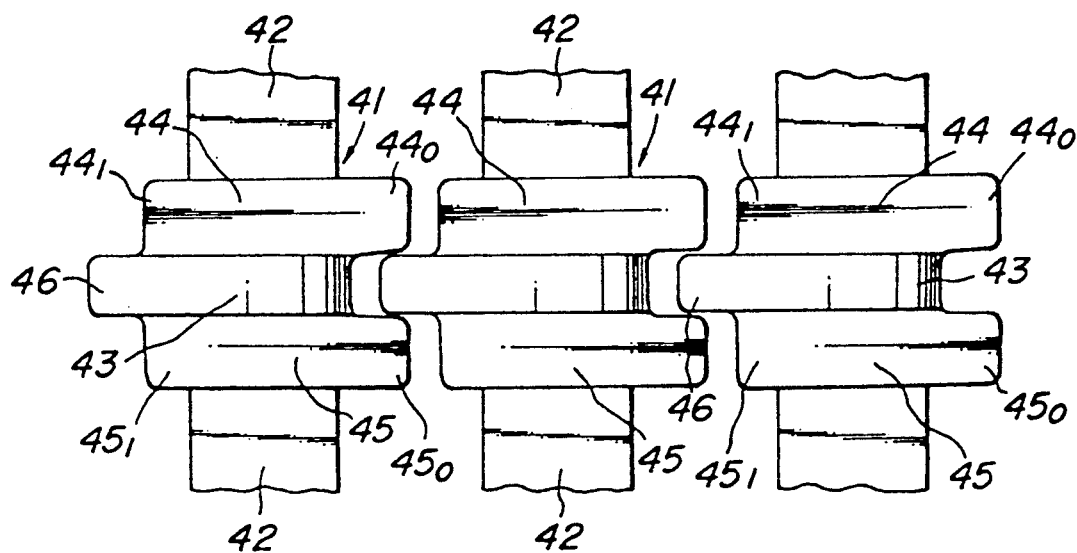
FIG._16
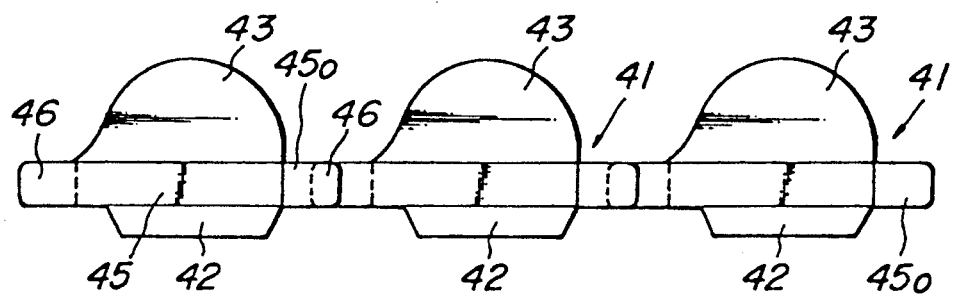

FIG_17
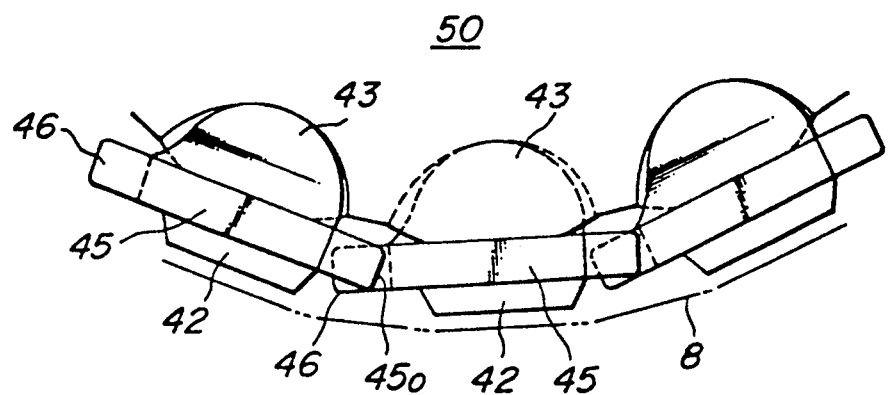
FIG_18
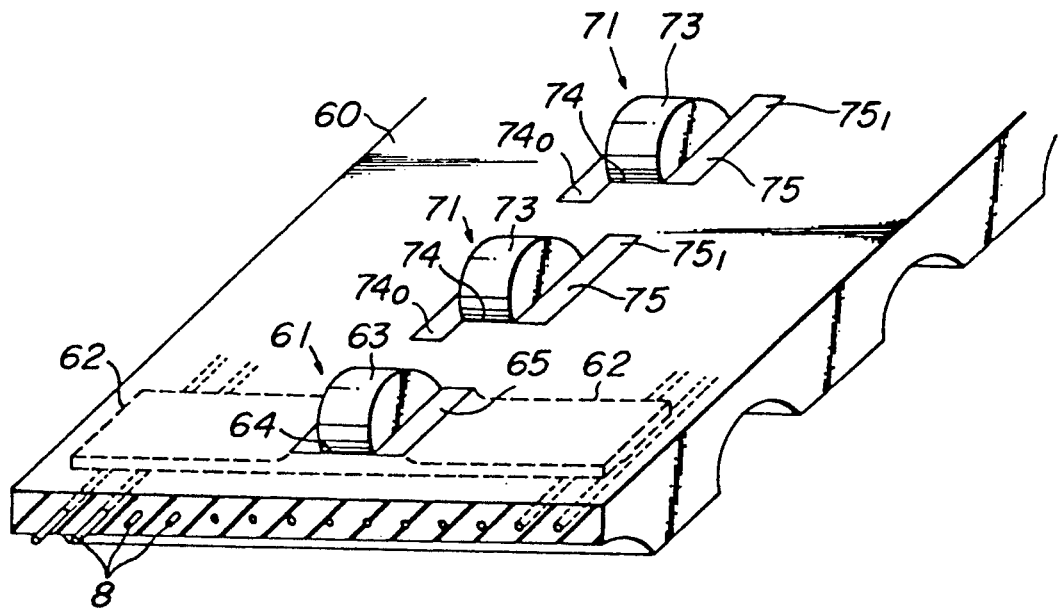

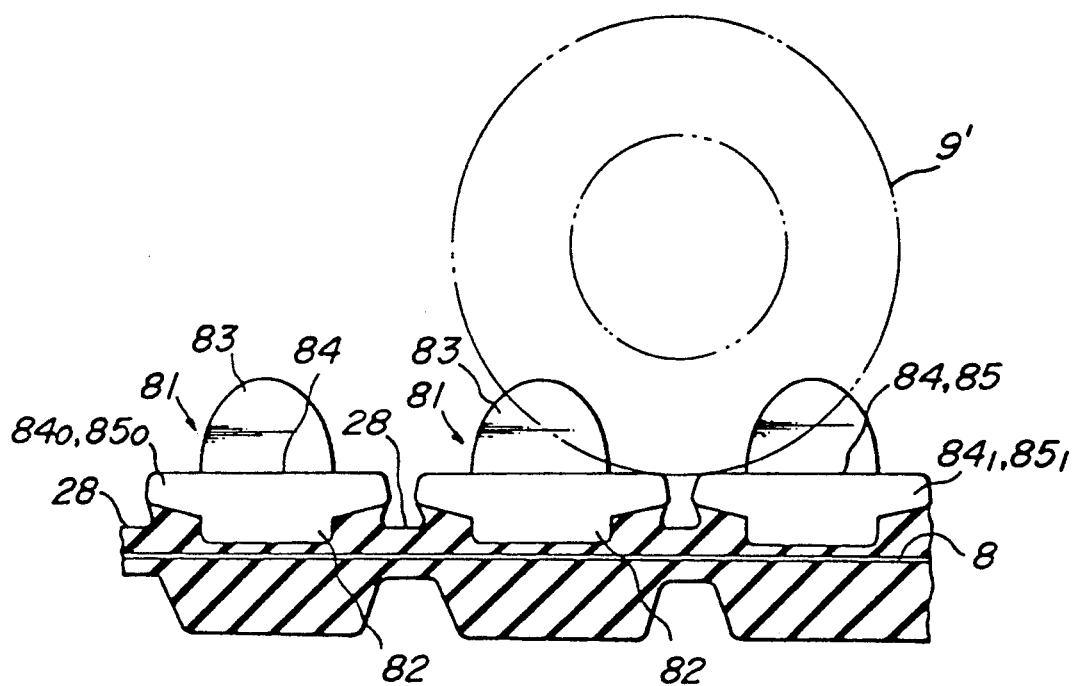
FIG_19

FIG._20
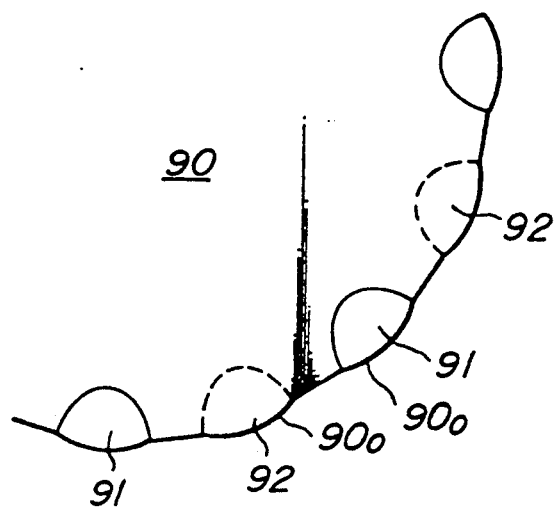
FIG._21
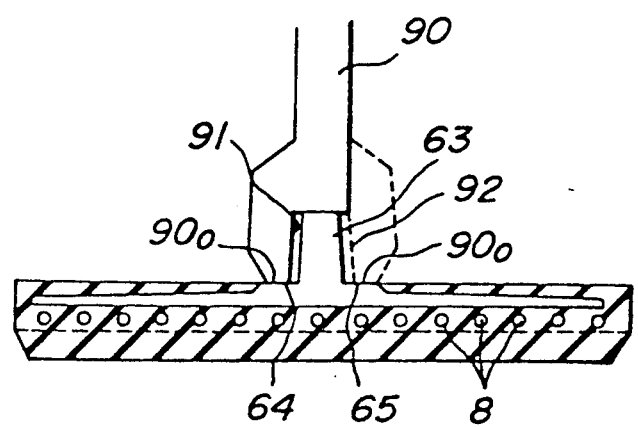

FIG_22
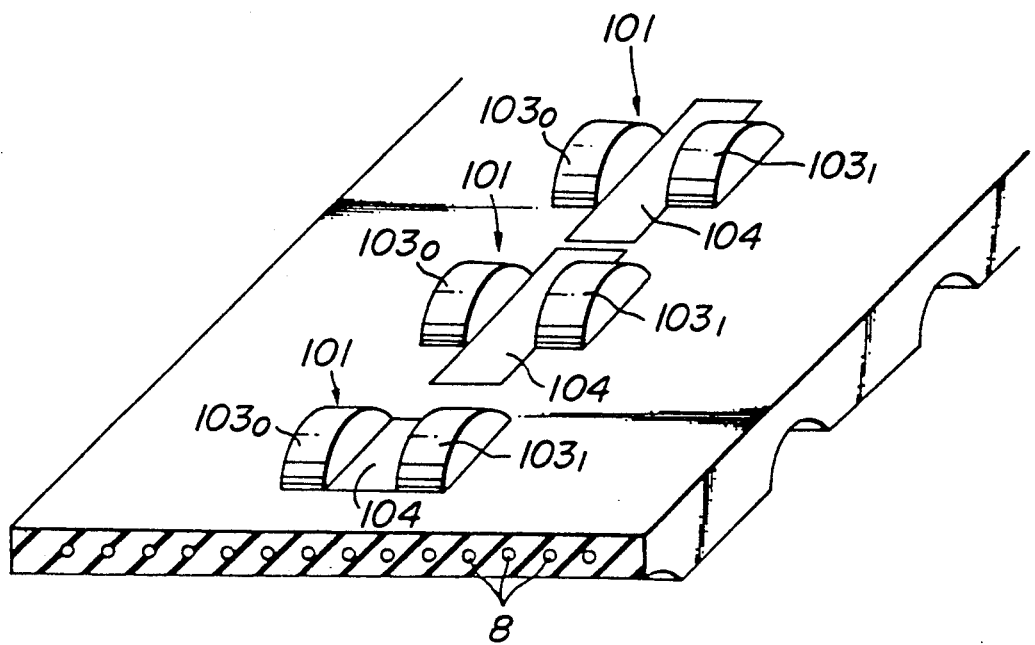
FIG_23
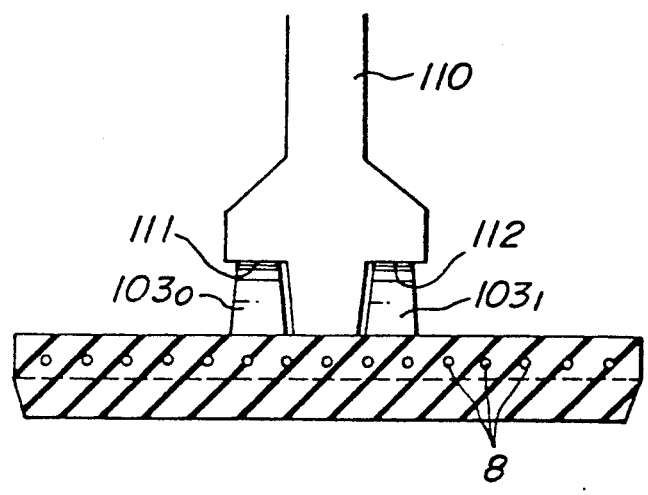

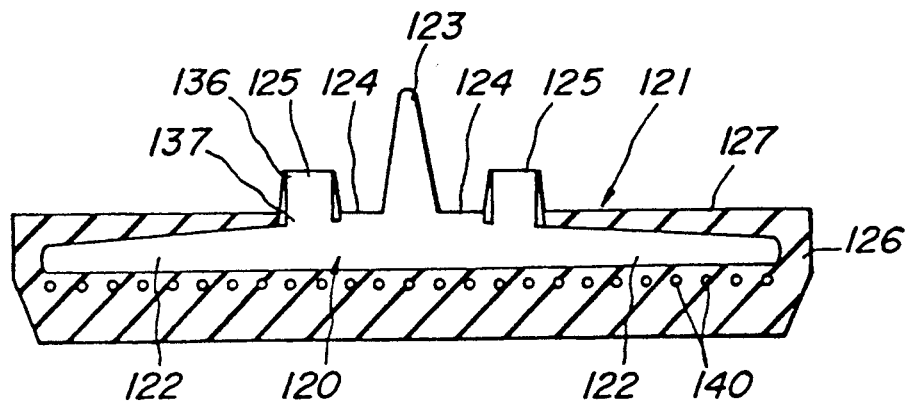
FIG_27
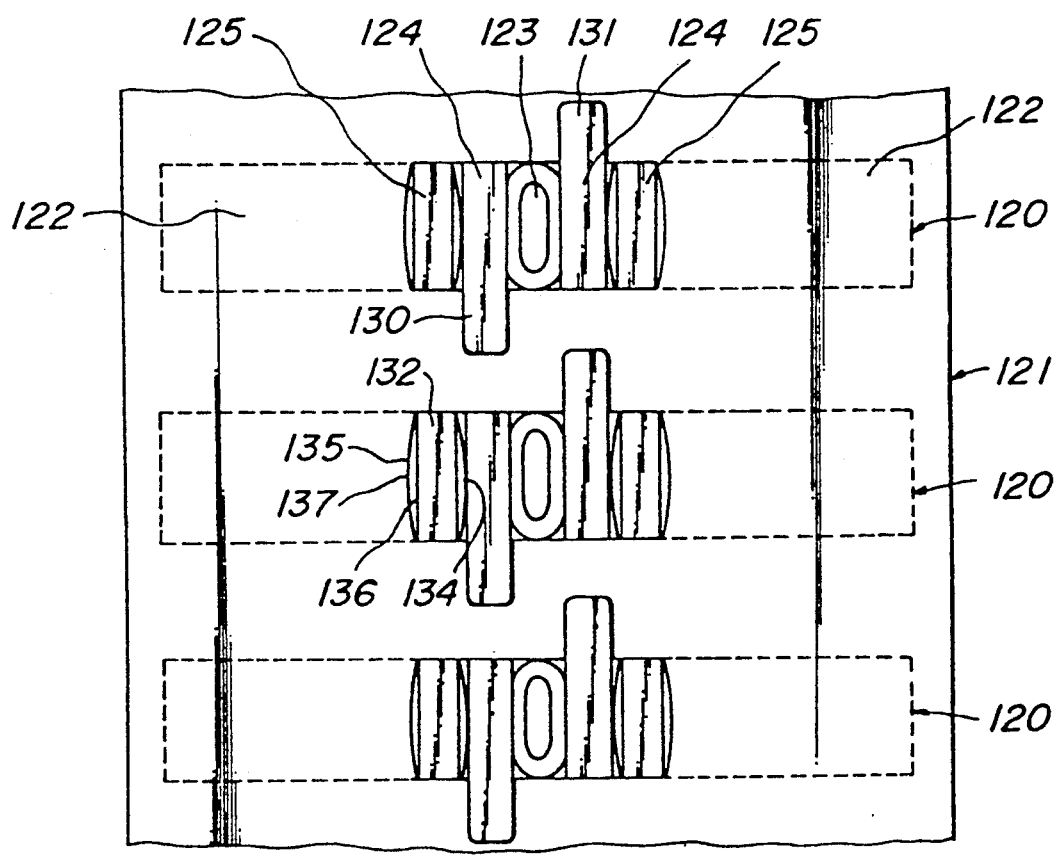
FIG_28

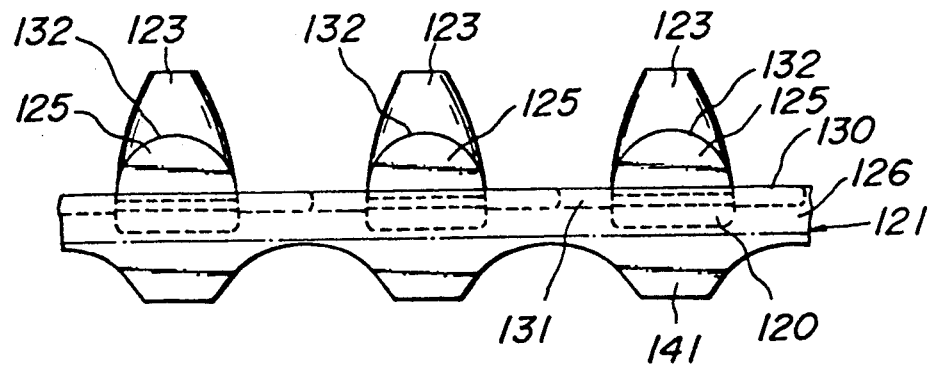
FIG_29
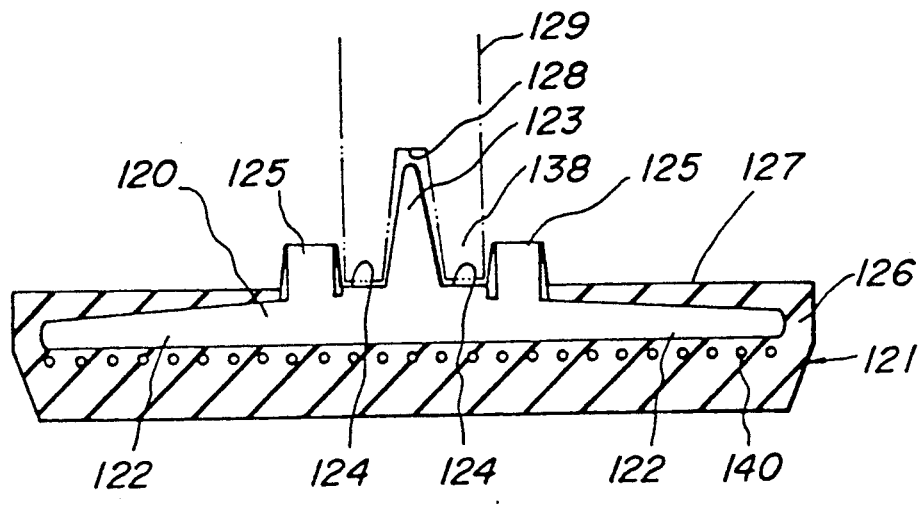
FIG_30
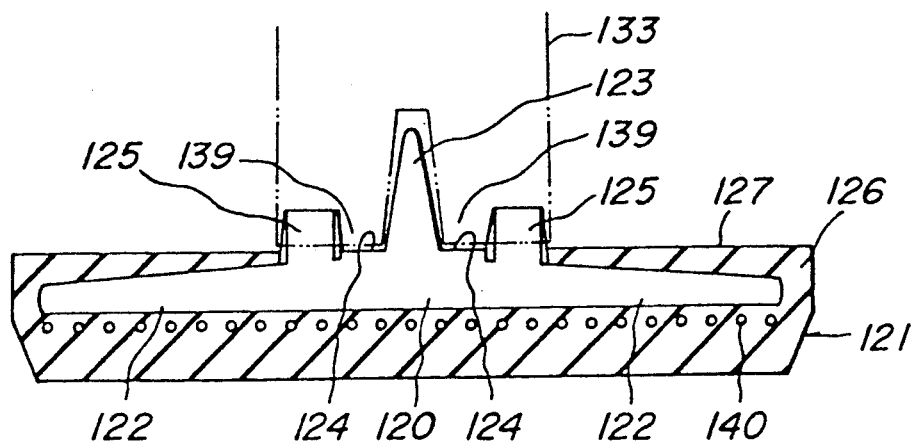
FIG_31

FIG_34
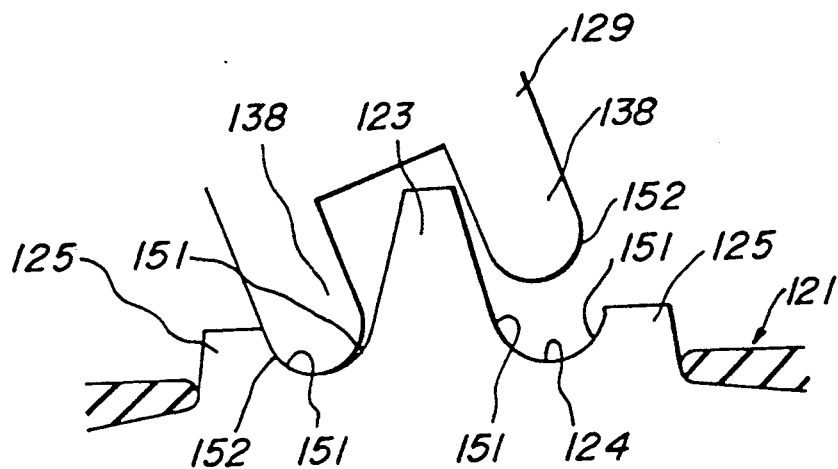
FIG_35
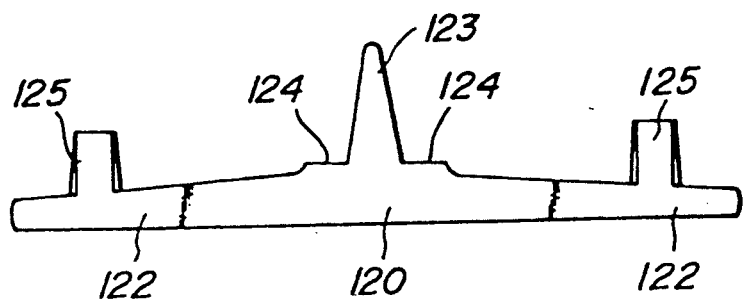

CORE BAR FOR RUBBER TRACK AND RUBBER TRACK TRAVELING DEVICE

BACKGROUND OF THE INVENTION

This invention relates to core bars for a rubber track, and more particularly to a rubber track traveling device mainly for use in construction equipment, earthworking equipment and the like.

Although rubber tracks have been used mainly for agricultural equipment, recently they have been employed for construction equipment and earthworking equipment. The rubber track includes an endless belt-shaped rubber-like elastic member, a number of core bars embedded therein and aligned in the longitudinal direction thereof and extending in traverse directions thereof, and steel cords (tension-resistant members) embedded in the endless elastic member to surround the core bars circumferentially outwardly. As such, rubber tracks are made of rubber-like materials, vibrations to be transmitted to occupants are mitigated and paved roads are not damaged. Therefore, rubber tracks have been used willingly.

On the other hand, however, when a vehicle equipped with rubber tracks moves on sandy terrain or quarries, the rubber tracks are likely to shift from advancing directions of the vehicle due to elongations and contractions of the rubber-like material in vertical and horizontal or other directions. As a result, the rubber tracks unavoidably get off sprocket wheels or track rollers of the vehicle. Various attempts have been made in order to prevent the dislodgement of the rubber tracks from the vehicle, but they have not met with success.

The present invention relates to an improvement of an inner track roller type rubber track whose core bars are formed with driving protrusions on the inner circumference of the rubber track. FIG. 1 illustrates in cross-section a prior art rubber track of the inner track roller type and FIG. 2 is a longitudinal sectional view of the rubber track. The core bar 2 of the rubber track includes wings 3 and 4 on both sides embedded in the rubber-like elastic member 1, a bridging center 5 connecting the wings 3 and 4, and a pair of protrusions 6 and 7 provided on both sides of the bridging center 5 and projecting from the inner circumferential surface of the rubber track. The core bars 2 are surrounded outwardly by steel cords 8 embedded in the rubber-like elastic member 1 in its longitudinal directions. As can be seen from the drawings, the bridging center 5 of the core bar 2 engages teeth of a sprocket wheel 9, and the elastic member 1 between the bridging centers of core bars 2 is formed with recesses 10 for the sprocket wheel 9. A track roller 17 provided on a vehicle rolls on the passage between the protrusions 6 and 7.

The bridging center 5 of the core bar 2 is required to have a predetermined width and a predetermined thickness for engagement with the sprocket wheel 9. Therefore, when the track roller 17 rolls between the protrusions 6 and 7 of the core bars 2, it repeatedly rides over the bridging centers 5 and falls onto the recesses 10 of the elastic member 1. As a result, personnel on the vehicle unfavorably undergo violent vibrations or oscillations. This is the largest disadvantage of the inner track roller type rubber track although it has a certain effect for prevention of rollers getting off the track. Such a disadvantage is unavoidable so long as the bridging center 5 engages the teeth of the sprocket wheel 9.

On the other hand, there is another driving system in which a rubber track is directly formed in its circumference with driving protrusions adapted to engage driving wheels. In this system, there is a tendency for small stones to jam between the driving protrusions and the driving wheels which cause cracks in the inner circumferential surface of the rubber track. Particularly, when track rollers roll on the inner circumference of the rubber track, sand and small stones tend to jam between track rollers and the rubber track to cause cracks in the inner circumferential surface of the rubber track. Therefore, this driving system involves a problem in durability for use as a rubber track.

FIG. 3 illustrates another prior art rubber track, which is used for construction equipment and can be usually used in place of an iron shoe crawler. Core bars 2 made by casting or forging are embedded with constant intervals in an endless rubber member 1. The core bar 2 includes wings 3 and 4, an engaging portion 5 engaging sprocket wheels, and protrusions 6 and 7 on both sides of the engaging portion 5 and projecting onto the inner circumference of the rubber track. Track rollers 9' roll on the upper surfaces of the protrusions 6 and 7. In the case of the iron shoe crawler, the track rollers 9' roll on links (not shown). Moreover, steel cords 8 as tension-resistant members are embedded usually in a row in the endless rubber member 1 on the outer circumferential side of the wings 3 and 4 of the core bars 2.

In rubber tracks used in large type construction equipment, the width of the tracks is often several tens cm, and core bars 2 used in the rubber tracks are much longer and thicker, whose weight is as much as several kg. Therefore, the weight of a rubber track including a number of such heavy core bars 2 embedded therein is as much as several hundreds kg. However, only the engaging portions of the core bars engaging the sprocket wheels serve to receive the driving force for driving the heavy and bulky rubber track.

On the other hand, the rubber track 1 is always subjected to tensile forces when it is running. Only the core bars 2 serve to maintain the rubber track 1 in a flat state against such tensile forces. Therefore, the center portions of the core bars 2 are subjected to great moments of inertia. Moreover, as the rubber track is formed along its longitudinal center line with recesses in a row for the sprocket wheels so that the longitudinal center portion of the rubber track is devoid of steel cords. As a result, the steel cords are divided at the center portion into two groups. Therefore, the wings 3 and 4 become longer and thus moments acting upon the core bars become larger as well. In conjunction with these facts, the center portions or the sprocket wheel engaging portions 5 of the core bars 2 must be wider and thicker in addition to the longer wings 3 and 4. As a result, great amounts of the material are needed for the rubber tracks.

In the prior art rubber track shown in FIG. 3, moreover, the two protrusions 6 and 7 of the core bar 2 are needed for traveling surfaces for the track roller 9'. Although these two protrusions 6 and 7 serve to prevent the rubber track from getting off, they are wasteful for the material of the core bar. What is worse still, when running on rocks or inclined surfaces, inclinations of the track roller 9' and the rubber track 1 become different so that the rubber track 1, particularly the protrusions 6 and 7 are likely to move away from the track roller 9' so that the rubber track unavoidably gets off from the vehicle.

SUMMARY OF THE INVENTION

It is an object of the invention to provide a core bar for a rubber track, which eliminates all the disadvantages of the prior art and which prevents its getting off and mitigates vibrations by employing the driving system for receiving driving force with protrusions projecting on the inner circumference of the rubber track and at the same time by employing the inner track roller system for track rollers.

It is another object of the invention to provide core bars and a rubber track traveling device which are lightweight and mitigate vibrations due to rolling of track rollers and at the same time hold the getting off preventing performance.

According to the invention, the respective performance of the core bar for receiving driving force and also for rolling track rollers are separated from each other to accomplish the first object. In a core bar for a rubber track including wings on both sides to be embedded in an elastic member of the rubber track, a bridging center for connecting the wings, and driving protrusions provided on both sides of the bridging center and projecting from the inner circumferential surface of the rubber track, according to the invention the bridging center comprises at least one projection formed on the bridging center and projecting from the wings in a longitudinal direction of the rubber track.

When a plurality of core bars are embedded in the elastic member to form the rubber track, projections of the core bars preferably overlap with each other as viewed from the side of the rubber track to form a continuous passage for a track roller or as viewed in a plane including the core bars to form a continuous passage for a track roller.

The core bar according to the first aspect of the invention includes wings on both sides to be embedded in an elastic member of the rubber track and extending in width directions of the rubber track, one driving protrusion formed at the center of the core bar so as to project from the inner circumferential surface of the rubber track, and a pair of track roller traveling surfaces formed on both sides of the driving protrusion to expose at the inner circumferential surface of the rubber track.

The core bar according to the second aspect of the invention includes wings on both sides to be embedded in an elastic member of the rubber track and extending in width direction of the rubber track, an anti-detracking protrusion formed at the center of the core bar and protruded from the inner circumferential surface of the rubber track, a pair of track roller traveling surfaces extending in the width direction of the core bar on both sides of the anti detracking protrusion and exposing at the inner circumferential surface of the rubber track, respectively, and a pair of driving protrusions formed at the outside of the track roller traveling surfaces, respectively for engaging a sprocket wheel of a vehicle.

A rubber track traveling device according to the first aspect of the present invention comprises an endless elastic member, core bars embedded in the elastic member with an interval and extending in width directions of the elastic member, and steel cords embedded in the elastic member to surround the core bars circumferentially outwardly, each of said core bars being formed at its center with one driving protrusion such that driving protrusions of the core bars embedded in the elastic member are aligned with one another along the center longitudinal line of the endless elastic member on its inner circumferential surface and being further formed on both sides of the driving protrusion of each of said core bars along the driving protrusion with track roller traveling surfaces projecting beyond the width of the core bar and exposed at the inner circumferential surface of the elastic member such that a track roller of a vehicle equipped with the rubber track is rolled on the track roller traveling surfaces of the core bars embedded in the elastic member, and further comprises a sprocket wheel of the vehicle to be engaged with the driving protrusions of the core bars to give driving force to the rubber track, said sprocket wheel being a disc-shaped member formed in its circumference with opened recesses having the similar radius with the radius of the head of the driving protrusion, said opened recesses being alternately positioned in both surfaces of the disc-shaped member so as to be engaged with the driving protrusions of the core bars.

A rubber track traveling device according to the second aspect of the present invention comprises an endless elastic member, core bars embedded in the elastic member with an interval and extending in width directions of the elastic member, and steel cords embedded in the elastic member to surround the core bars circumferentially outwardly, each of said core bars being formed at its center with an anti-detracking protrusion such that anti-detracking protrusions of the core bar embedded in the elastic member are aligned with one another along the center longitudinal line of the endless elastic member on its inner circumferential surface, being formed on both sides of the anti-detracking protrusion of each of said core bars along the anti-detracking protrusion with track roller traveling surfaces projecting beyond the width of the core bar and exposing at the inner circumferential surface of the elastic member such that a track roller of a vehicle equipped with the rubber track is rolled on the track roller traveling surfaces of the core bars embedded in the elastic member and being further formed at the outside of the track roller traveling surfaces with a pair of driving protrusions, and further comprises a sprocket wheel of the vehicle to be engaged with the driving protrusions of the core bars to give driving force to the rubber track, said sprocket wheel being a disc-shaped member formed in its circumference with opened recesses having the similar radius with the radius of the head of the driving protrusions said opened recesses being alternately positioned in both surfaces of the disc-shaped member so as to be engaged with the driving protrusions of the core bars.

The invention will be more fully understood by referring to the following detailed specification and claims taken in connection with the appended drawings.

BRIEF DESCRIPTION OF THE DRAWINGS

FIG. 1 is a sectional view of a rubber track of the prior art;

FIG. 2 is a sectional view of the rubber track shown in FIG. 1, taken along a longitudinal line thereof;

FIG. 3 is a sectional view of another rubber track of the prior art;

FIG. 4 is a plan view illustrating core bars of the first embodiment of the invention;

FIG. 5 is a front elevation of the core bar shown in FIG. 4;

FIG. 6 is a sectional view of the core bar shown in FIG. 4 taken along a longitudinal line thereof;

FIG. 7 is a plan view illustrating core bars of the second embodiment of the invention;

FIG. 8 is a plan view illustrating core bars of the third embodiment of the invention;

FIG. 9 is a sectional view of the core bars shown in FIG. 8 taken along a longitudinal line thereof;

FIG. 10 is a front elevation illustrating a core bar of the fourth embodiment of the invention;

FIG. 11 is a sectional view illustrating driving protrusions of another embodiment of the invention;

FIG. 12 is a plan view illustrating a core bar of another embodiment of the invention;

FIG. 13 is a sectional view of the core bar shown in FIG. 12 taken along a longitudinal line thereof;

FIG. 14 is a side view of the core bar shown in FIG. 12;

FIG. 15 is a plan view illustrating core bars of a further embodiment of the invention;

FIG. 16 is a side view of the core bars shown in FIG. 15;

FIG. 17 is a side view of the core bars shown in FIG. 15 moving around a sprocket wheel;

FIG. 18 is a sectional perspective view of a rubber track using core bars shown in FIG. 12;

FIG. 19 is a sectional perspective view of a rubber track using core bars shown in phantom lines in FIG. 12;

FIG. 20 is a partial side view illustrating, by way of example, a sprocket wheel used in the invention;

FIG. 21 is a sectional view illustrating the sprocket wheel shown in FIG. 20 engaging the core bar of the rubber track shown in FIG. 18;

FIG. 22 is a sectional perspective view illustrating a rubber track of another embodiment of the invention;

FIG. 23 is a sectional view illustrating a sprocket wheel engaging the core bar of the rubber track shown in FIG. 22;

FIG. 27 is a sectional view of a rubber track including the core bar shown in FIG. 24;

FIG. 28 is a plan view of the rubber track shown in FIG. 27;

FIG. 29 is a side view of the rubber track shown in FIG. 27;

FIG. 30 is a sectional view illustrating a track roller engaging the core bar of the rubber track shown in FIG. 27;

FIG. 31 is a sectional view illustrating a sprocket wheel engaging the core bar of the rubber track shown in FIG. 27;

FIG. 34 is a detailed diagrammatic view illustrating the sprocket wheel engaging the core bar of the rubber track and being relatively inclined to the rubber track;

FIG. 35 is a front elevation of a core bar of a further embodiment of the invention;

DESCRIPTION OF THE PREFERRED EMBODIMENTS

Figure 24:
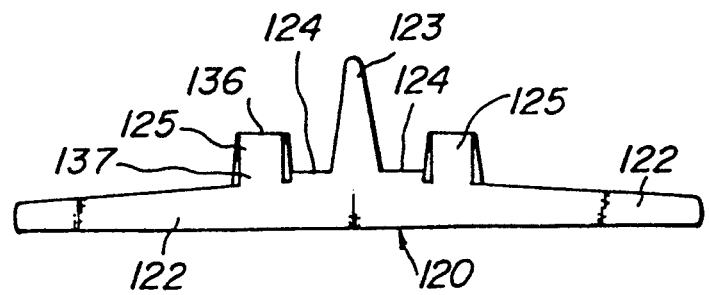
FIG. 24 is a front elevation of a core bar of another embodiment of the invention.
Figure 25:
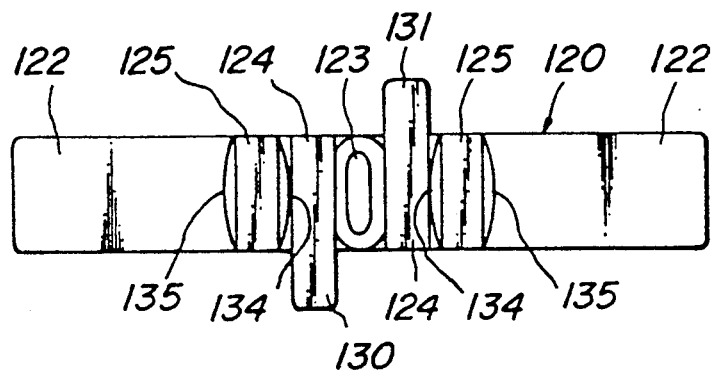
FIG. 25 is a plan view of the core bar shown in FIG. 24.
Figure 26:
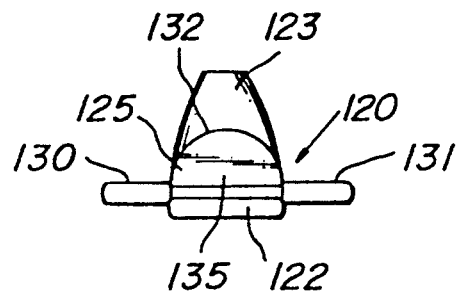
FIG. 26 is a side elevation of the core bar shown in FIG. 24.

Referring to FIGS. 4 to 6 illustrating core bars A for a rubber track of the first embodiment according to the invention, each of core bars comprises wings 11 and 12 to be embedded in a rubber-like member (not shown), and a bridging center 13 connecting the wings 11 and 12 and driving protrusions 14 and 15 formed on both ends of the bridging center 13 to project from the inner circumferential surface of the rubber track. Sprocket pins 16 engage the driving protrusions 14 and 15 to drive the rubber track. On the other hand, track rollers 17 roll between the driving protrusions 14 and 15. The bridging center 13 is formed with projections 18 and 19 extending in longitudinal directions of the rubber track beyond the width of the wings 11 and 12. Therefore, the bridging centers 13 and the projections 18 and 19 of the core bars A form traveling surfaces for the track roller 17.

With this arrangement, upward and downward movements of the rack rollers 17 are restrained by the projections 18 and 19 so that an operator of the vehicle equipped with the rubber tracks undergoes only weak vibrations. As particularly shown in FIG. 4, it is preferable that the projections 18 and 19 have oblique forward and rearward ends so that these projections 18 and 19 overlap with each other as viewed from the side of the vehicle. As a result, the track rollers 17 always contact the traveling surfaces so that smooth rolling of the track rollers is ensured.

According to the invention, portions of the core bars for receiving the driving force and the rolling surfaces formed by the core bars for track rollers are separated from each other to enable the bridging centers of the core bars to be formed with the projections in longitudinal directions of the rubber track. As a result, it becomes possible to form the continuous traveling surfaces for the track rollers so that vibrations due to upward and downward movements of the track rollers can be prevented.

FIG. 7 illustrates core bars B according to the second embodiment of the invention. In this embodiment, projections 18 and 19 extend in forward and rearward directions and are staggered with each other or shifted laterally relative to the longitudinal direction of the rubber track. The projections 18 and 19 overlap one another viewed from the side thereof. Therefore, track rollers always travel on the traveling surfaces formed by the core bars.

FIGS. 8 and 9 illustrate the third embodiment of the invention. Each of core bars C is formed on its one side with only one projection 19 which is long enough to arrive on the bridging center of the adjacent core bar. Therefore, the projections 19 and the bridging centers 13 of the core bars according to the third embodiment overlap one another to form traveling surfaces for track rollers 17. Reference numeral 20 in FIG. 9 denotes a clearance between the projection 19 and the bridging center 13 of the adjacent core bar.

FIG. 10 illustrates a core bar D of the fourth embodiment of the invention. A plan view of the core bar D is omitted because it is substantially similar to that of FIG. 4. In the fourth embodiment, the difference in height of the bridging center 13 from wings 11 and 12 is larger than that of the core bar A in FIG. 5 so that the upper surface of the bridging center 13 is positioned lower than underside surfaces of the wings 11 and 12. Steel cords 21 are embedded in a row in the rubber track in a plane substantially the same as the upper surface of the bridging center 13. When the rubber track extend around sprocket wheels and track rollers, the steel cords 21 are positioned at the center of the rubber track. Since the upper surfaces of the bridging centers 13 are also in the center of the rubber track, the core bars D smoothly move around the sprocket wheels or track rollers when in use. In other words, the upper surfaces of the bridging centers 13 in the same plane as that of the steel cords 21 in the row are supported by the sprocket wheels and track rollers in abutting against the upper surfaces of the bridging centers 13. Therefore, when the core bars pass around the sprocket wheels and track rollers, the core bars smoothly move therearound without upward and downward movements of the core bars.

FIG. 11 illustrates core bars E in central section whose driving protrusions 14 and 15 are modified as a fifth embodiment. In this embodiment, each of the driving protrusions includes at the center a curved concave surface 22. A sprocket wheel pin 16 engages the curved concave surface 22 to drive the core bar E.

As can be seen from the above explanation, the core bars for a rubber track according to the invention are formed in a particular configuration in order to separate in mechanism the performance for affording driving force to the rubber truck from the performance for preventing the rubber track from getting off sprocket wheels and track rollers. Therefore, the rubber track using such core bars according to the invention is free from vibrations or at least undergoes less vibration and is difficult to get off sprocket wheels or track rollers. Moreover, the rubber track using the core bars according to the invention is free from any risk of its inner circumferential surface being damaged and is durable in use.

FIGS. 12 to 14 illustrate a core bar 31 for a rubber track according to a further embodiment of the invention. The core bar 31 includes wings 32 to be embedded in a rubber and a protrusion 33 at the center of the core bar 31. The protrusion 33 is adapted to engage sprocket wheels for driving the rubber track and of course serves to prevent the rubber track from getting off the sprocket wheels and track rollers. The core bar 31 is formed on both sides of the protrusion 33 with track roller traveling surfaces 34 and 35 along the protrusion 33. The track roller (not shown) is laid over the protrusion 33 and has at both ends rolling flanges which roll on the track roller traveling surfaces 34 and 35.

In this embodiment, there are grooves 36 between the protrusion 33 and the traveling surfaces 34 and 35, and the protrusion 33 has side edges somewhat rounded off viewed in the plan view of FIG. 12. Moreover, the traveling surfaces 34 and 35 alternately extend in longitudinal directions of the rubber track to form projections $34_0$ and $35_1$ which serve to form continuous track roller traveling surfaces when the core bars are embedded in the rubber track. Such projections may of course be additionally provided on opposite sides as shown in phantom lines at $34_1$ and $35_0$ in FIG. 12.

Moreover, the track roller traveling surfaces 34 and 35 are preferably curved surfaces somewhat recessed at their centers, which are able to adjust upward and downward movements of track rollers due to inclination of the core bars when the track rollers ride over and leave from the traveling surfaces 34 and 35 and downward movements of track rollers when they arrive at the recessed portions of the traveling surfaces 34 and 35 at their centers. Such an adjustment reduces the upward and downward movements of the track rollers to mitigate vibrations.

FIG. 15 illustrates core bars 41 of a further embodiment of the invention, showing a positional relationship of the core bars 41 embedded in a rubber track (not shown). FIG. 16 is a side view of the core bars 41 shown in FIG. 15. As shown in the drawings, each of the core bars 41 includes wings 42 extending in lateral directions and a protrusion 43 at its center. Traveling surfaces 44 and 45 are provided on both sides of the protrusion 43 and extend beyond the forward and rearward edges of the wings 42 to form projections $44_1$, $45_1$, $44_0$ and $45_0$. This embodiment is characterized in the feature of joining projections $44_1$ and $45_1$ of the traveling surfaces 44 and 45 on one side and forming at the joining portion a small protrusion 46 having a width to be fitted between the projections $44_0$ and $45_0$ of the adjacent core bar 41. As shown in the drawings, therefore, the adjacent core bars 41 are successively fitted with one another with their small protrusions 46 and projections. Such a fitting serves to maintain the core bars 41 in the predetermined direction to keep the rolling surfaces of the core bars 41 in the same direction and to prevent the core bars 41 from moving into lateral directions.

FIG. 17 is a side view illustrating the core bars 41 shown in FIG. 15 embedded in a rubber track and extending around a sprocket wheel 50. As can be seen from FIG. 17, the adjacent core bars 41 move around the sprocket wheel 50 with the projections $44_0$ and $45_0$ and the small protrusions 46 fitted with each other so that the extending of the core bars 41 around the sprocket wheel 50 becomes stable.

FIG. 18 is a sectional perspective view illustrating the core bars 61 and 71 according to the invention embedded in a rubber to form a rubber track 60. This drawing illustrates simultaneously different rubber tracks using two kinds of core bars. The core bar 61 includes wings 62 extending in lateral directions and at its center a protrusion 63 on both sides of which traveling surfaces 64 and 75 are formed for track rollers. The travelling surfaces 64 and 65 are exposed to the inner circumferential surface of the rubber track 60.

On the other hand, the core bar 71 is substantially similar to that shown in FIG. 12 includes traveling surfaces 74 and 75 alternately projecting as shown at $74_0$ and $75_1$ from wings (not shown). The core bars 71 are embedded in the rubber track 60 such that the projections $74_0$ and $75_1$ face to each other. Steel cores 7 are embedded in a row in the rubber track 60 such that they immediately outwardly surround the wings 62 of the core bars 61 and 71.

FIG. 19 illustrates a rubber track in cross-section taken along the longitudinal center line thereof using core bars 81 substantially similar to the core bar shown in FIG. 12. In this case, traveling surfaces 84 and 85 are formed with projections $84_0$, $84_1$, $85_0$ and $85_1$. For the sake of convenience in extending the rubber track around sprocket wheels (not shown), the rubber track is formed with recesses 28 between projections $84_0$ and $84_1$ and between projections $85_0$ and $85_1$ facing each other.

In FIG. 19, a track roller 9′ is laid over the protrusion 83 and includes rolling flanges positioned on both sides of the protrusions 83 of the core bar 81 and rolling on traveling surfaces 84 and 85. As the traveling surfaces 84 and 85 have the projections 84₀, 84₁, 85₀ and 85₁ in the rolling directions of the track roller 9', the track roller 9' falls downward to a lesser extent when the track roller 9' moves from one core bar 81 to traveling surfaces 84 and 85 of the next core bar 81. Moreover, as the difference in height between the traveling surfaces 84 and 85 and the steel cords 8 arranged in a neutral plane upon moving around the track roller 9' is relatively small, vibrations caused by downward falling of the track roller 9' are restrained to little.

FIG. 20 illustrates a disc-shaped sprocket wheel 90 preferably used in this invention, which is formed in its circumference with recesses 91 and 92 alternately positioned in both surfaces and adapted to engage protrusions of the core bars so that driving force is transmitted from the sprocket wheel 90 to the core bars. The recesses 91 and 92 of the sprocket wheel are not closed but opened on one side so that there is no risk of the recesses being clogged with soil and sand and there is less chance of the sprocket wheel being entangled with grasses and bushes. The recesses 91 and 92 of the sprocket wheel 90 are slightly larger than the protrusions of the core bars. The bottoms of the recesses 91 and 92 may be formed with flat portion of the order of 6 to 20 mm depending upon the shapes of the protrusions. Angles $\alpha$ of the recesses 91 and 92 at their opening are preferably of the order of 50 to 80°.

FIG. 21 is a sectional view illustrating the sprocket wheel shown in FIG. 20 in mesh with the rubber track shown in FIG. 18. The disc-like sprocket wheel 90 is formed with recesses 91 and 92 positioned alternately on both sides and adapted to engage the protrusions 63 of the core bars. The bottoms of the recesses 91 and 92 are adapted to contact top surfaces of the protrusions 63, while the outer circumferential face 90₀ of the sprocket wheel 90 are adapted to contact traveling surfaces 64 and 65. The contact between the outer circumferential face 90₀ and the traveling surfaces 64 and 65 is preferably a surface contact rather than a point contact. FIG. 17 illustrates one example of the surface contact.

FIG. 22 illustrates another embodiment of the rubber track according to the invention. Each of core bars 101 embedded in the rubber is formed at its center with a pair of protrusions 103₀ and 103₁ and with a track roller traveling surface 104 between the protrusions 103₀ and 103₁.

FIG. 23 illustrates a relation between the rubber track shown in FIG. 22 and a sprocket wheel 110. The sprocket wheel 110 is formed in both surfaces with recesses 111 and 112 in pairs which are adapted to engage protrusions 103₀ and 103₁.

As can be seen from the above explanation, the core bars for a rubber track according to the invention are lightweight. The traveling device using the rubber track according to the invention prevents the rubber track from getting off sprocket wheels and track rollers and decreases upward and downward movements of the track rollers in running. Therefore, the traveling device using the rubber track according to the invention is easy to operate in use and superior in riding comfortability for personnels on a vehicle equipped with the travelling devices.

Moreover, the rubber track according to the invention is simple in configuration so that molds for forming the rubber track are simplified to improve the productivity, while the surface of the rubber truck to contact the ground is flat so that freedom of design to meet purposes such as design of lug patterns is increased.

FIGS. 24 to 31 illustrate a core bar 120 adapted for using in a rubber track 121 according to another embodiment of the invention. The core bar 120 includes wings 122 on both side thereof, an anti-detracking protrusion 123 formed at the center of the core bar 120, a pair of track roller traveling surfaces 124 extended along both sides of the anti-detracking protrusion 123 and a pair of driving protrusions 125 formed at the outside of the track roller traveling surfaces 124.

The wings 122 are embedded in a rubber elastic member 126 of the rubber track so as to extend in width direction of the rubber track. The anti-detracking protrusion 123 is sufficiently protruded from the inner circumferential surface 127 to engage with a groove 128 of a track roller 129 rolling on the track roller traveling surfaces 124 as shown in FIG. 30 and thereby to prevent detracking of the track roller.

The track roller traveling surfaces 124 extend in the width direction of the core bar 120 on both sides of the anti-detracking protrusion 123 and expose at the inner circumferential surface 127, respectively. As shown in this embodiment, the track roller traveling surfaces 124 may project beyond the width of the wings 122 to provide forward and rearward extended portions 130 and 131 of the traveling surfaces 124, respectively, so as to make the rolling motion of the track roller 129 smooth. The track roller traveling surface may be provided at the central portion with a longitudinal recess having a depth of 1~5 mm in order to improve the motion of the track roller in up and down directions.

Each of the driving protrusions 125 has arched outer peripheral surface 132 (FIG. 29) adapted for engaging peripheral recesses 145 of a sprocket wheel 133 of a vehicle and rounded inner and outer side surfaces 134 and 135 to make the head portion 136 narrower than the base portion 137 of the driving protrusions 125 so as to easily recover a normal engagement with the sprocket wheel teeth 139 of the sprocket wheel 133 so as to be continuously transmitted driving force to the driving protrusions 125 when the sprocket wheel 133 inclines with respect to the rubber track 121. The profile of the driving protrusion 125 is preferable to make the arched shape as mentioned above, but various shape may be taken in accordance with conditions such as driving force to be transmitted and others.

The core bars 120 are arranged in the rubber elastic member 126 of the rubber track 121 to space apart from each other with a constant pitch in the longitudinal direction of the rubber track in such a manner that the anti-detracking protrusions 123 of the core bars 120 are aligned with one another along the center longitudinal line of the endless rubber elastic member 126 on the inner circumferential surface 127. Steel cords 140 are also embedded in a row in the rubber elastic member under the wings 122 of the core bars and extended in the longitudinal direction of the rubber track having rubber lugs 141 formed on the outer circumferential surface of the rubber elastic member 126.

Figure 32:
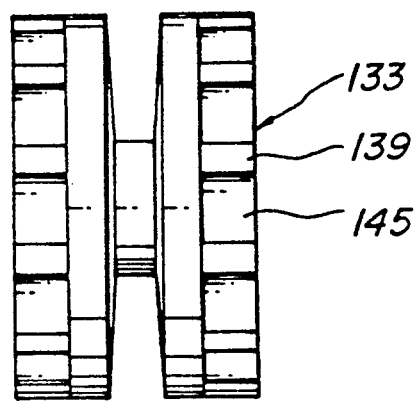
FIG. 32 is a front view illustrating one embodiment of a sprocket wheel.
Figure 33:
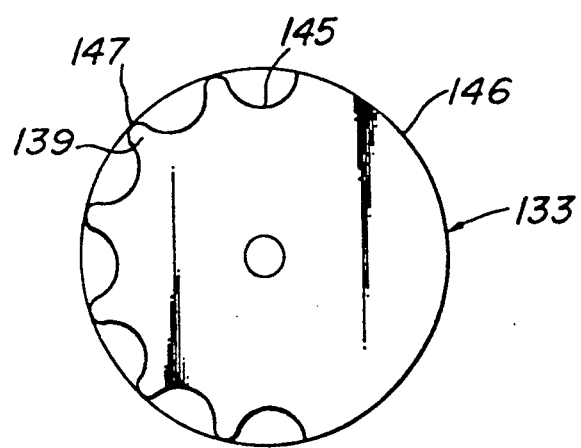
FIG. 33 is a side view of the sprocket wheel shown in FIG. 32.

FIGS. 32 and 33 illustrate an embodiment of the sprocket wheel 133 formed of disc-shaped member. The sprocket wheel 133 is formed in its circumference with a plurality of opened recesses 145 having the similar radius with the radius of the head portion 136 of the driving protrusions 125 of the core bars 120. The opened recesses 145 are alternately positioned in both side surfaces of the sprocket wheel so as to be engaged with the driving protrusions 125. It is preferable that the diameter of the outer periphery 146 of the sprocket wheel 133 is slightly larger than that of a circle connecting tips 147 of the sprocket wheel teeth 139. The inner circumferential surface 127 of the rubber elastic member 126 may be recesses in portions adjacent to ends of the track roller traveling surface 124 to be free from direct contact with the portions of the rubber elastic member 126 and the track roller 129 rolling on the rack roller traveling surfaces 124 in order to prevent occurring to cracks in the rubber elastic member.

During running of a vehicle, the sprocket wheel 133 and track roller 129 straddle the anti-detracking protrusions 123 at the center of the rubber track 121 and roll on the track roller traveling surfaces 124. Therefore, when the vehicle runs an inclined ground or rides on a stone, further or turns along a sharp curve, the rubber track 121 is possible to incline at an angle of 20~30 degrees relative to the track roller 129, but the sprocket wheel 133 and track roller 129 are hardly detracked owing to engagement with the anti-detracking protrusions 123.

FIG. 34 illustrates a relationship of the track roller traveling surfaces 124 and the track roller 129 which inclines relative to the rubber track 121. Boundaries 150 and 151 of the track roller traveling surfaces 124 interposed between the anti-detracking protrusion 123 and the driving protrusions 125 are defined by curved surfaces, and correspondingly the edges 138 of the track roller 129 rolling on the track roller traveling surfaces 124 is formed by curved surfaces 152 having the substantially same shape as that of the curved surface of the track roller traveling surfaces 124.

Thus, even if the track roller 129 inclines relative to the rubber track 121 as shown in FIG. 34, a face contact is maintained between the curved surfaces 151 and 152 so that loads applied to the curved surfaces 151 and 152 contacting to each other is equalized without localizing upon the surfaces and as a result both the track roller traveling surfaces 124 and track roller 129 are free from damage.

FIG. 35 illustrates a further embodiment of the core bar according to the present invention. In this embodiment, the driving protrusions 125 are spaced apart in the longitudinal direction of the core bar 120 and positioned end portions of the wings 122.

Figure 36:
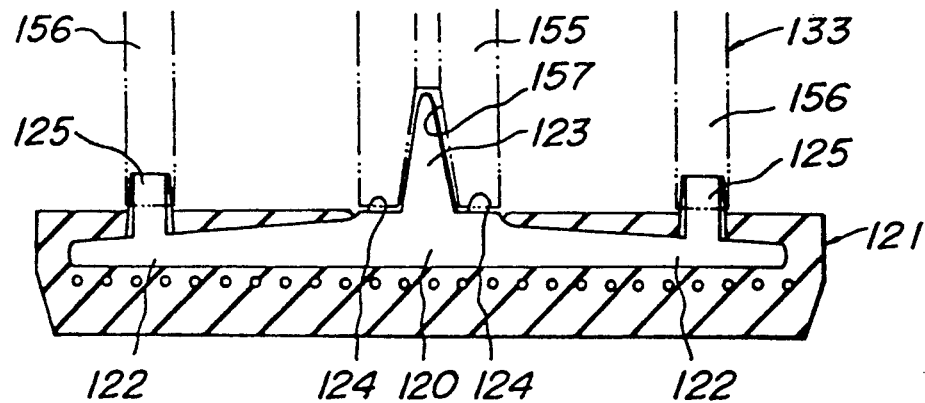
FIG. 36 is a sectional view of a rubber track including the core bar shown in FIG. 35.
Figure 37:
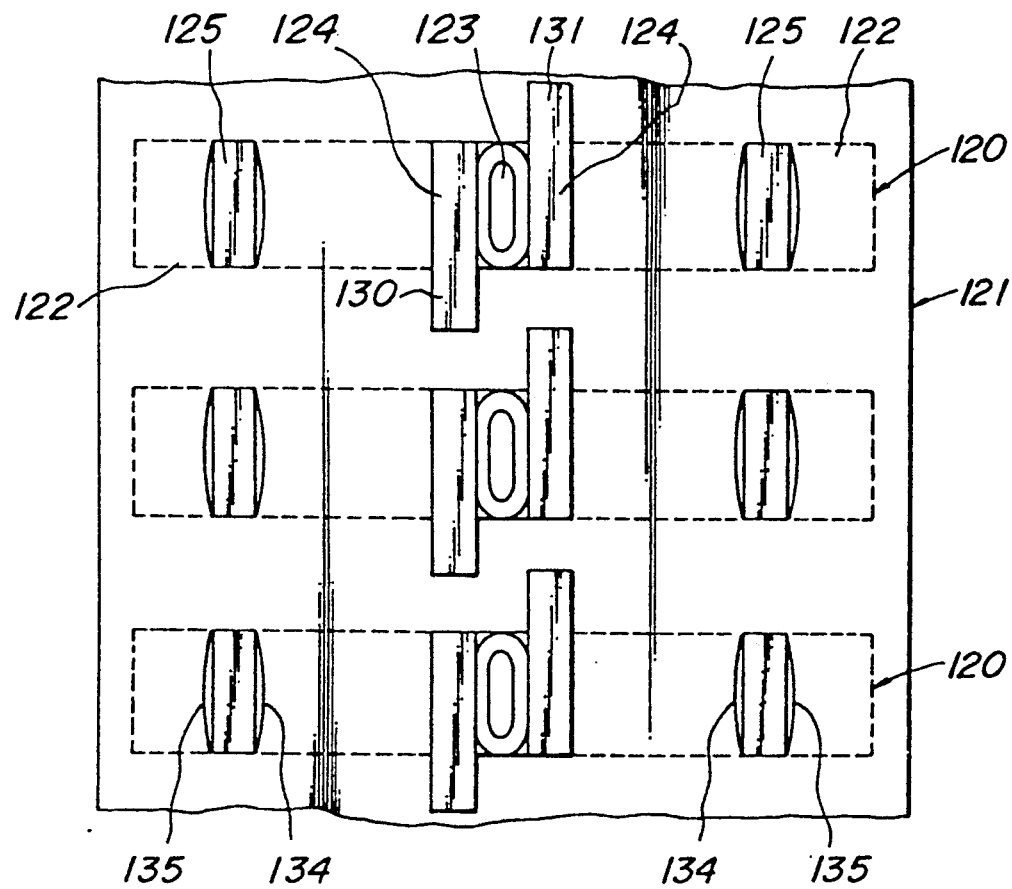
FIG. 37 is a plan view of the rubber track shown in FIG. 36.

FIGS. 36 and 37 illustrate a rubber track 121 provided with core bar shown in FIG. 35. As shown in FIG. 36, a sprocket wheel 133 included a track roller portion 155 formed at the central portion thereof so as to straddle the anti-detracking protrusions 123 and rolls on the track roller traveling surfaces 124, and a pair of sprocket wheel portions 156 formed at both side, respectively, for engaging with the driving protrusions 125. The track roller 155 and the sprocket wheel portions 156 are rigidly connected. The track roller 154 has a central groove 157 for normally engaging with the central anti-detracking protrusions 123 to position the sprocket wheel portions 156 such that teeth of the sprocket wheel portions 156 engage the driving protrusions 125 to transmit a driving force to the rubber track 121.

The rubber elastic member 126 of the rubber track 121 may be provided at regions between driving protrusions of the adjacent core bars 120 with recesses or holes in order to reduce occurring of cracks in the rubber elastic member and thus durability of the rubber track is improved.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A core bar for a rubber track including wings on both sides to be embedded in an elastic member of the rubber track and extending in an elastic member of the rubber track and extending in width directions of the rubber track, a pair of driving protrusions spaced apart in the width directions of the rubber track at the central portion of the core bar so as to project from the inner circumferential surface of the rubber track and a track roller traveling surface extending between the driving protrusions beyond the width of the core bar so as to expose at the inner circumferential surface of the rubber track.

2. A core bar of a rubber track for a rubber track traveling device comprising track rollers and driving sprockets, said core bar including wings on both sides to be embedded in an elastic member of the rubber track and extending in width directions of the rubber track, one central driving protrusion formed at the center of the core bar and protruded from the inner circumferential surface of the rubber track, and a pair of track roller traveling surfaces formed on both sides of the driving protrusion, said central driving protrusion having rounded side edges on opposite sides thereof for engaging the sprocket wheel.

3. The core bar as set forth in claim 2, wherein the track roller traveling surfaces project beyond widths of the wings in forward and rearward directions to form projections.

4. The core bar as set forth in claim 2, wherein said track roller traveling surfaces have projections alternating outward from each side of said central driving protrusion.

5. The core bar as set forth in claim 2, wherein said central driving protrusion further comprises an extension forming one of said pair of track roller traveling surfaces.

6. A core bar for a rubber track for a rubber track traveling device comprising track rollers and driving sprockets, said core bar including wings on both sides to be embedded in an elastic member of the rubber track and extending in width direction of the rubber track, an anti-detracking protrusion formed at the center of the core bar and protruded from the inner circumferential surface of the rubber track, a pair of track roller traveling surfaces extending in the width direction of the core bar on both sides of the anti-detracking protrusion, and a pair of driving protrusions formed at the outside of the track roller traveling surfaces, each of said driving protrusions having rounded side edges on opposite sides thereof for engaging a sprocket wheel of a vehicle.

7. The core bar as set forth in claim 6, wherein said track roller traveling surfaces each have conformal angled end surfaces such that adjacent end surfaces of two adjacent track roller traveling surfaces overlap each other along conformal angled ends.

8. The core bar as set forth in claim 6, wherein said track roller traveling surfaces each have conformal staggered end surfaces such that adjacent end surfaces of two adjacent track roller traveling surfaces overlap each other along conformal ends.

9. The core bar as set forth in claim 6, wherein said pair of track roller traveling surfaces comprise a first driving surface extending outwardly and a second surface having a recess, said recess sized to receive a first driving surface from an adjacent core bar that overlaps onto said adjacent core bar.

10. the core bar as set forth in claim 6, wherein the track roller traveling surfaces project beyond widths of the wings in forward and rearward directions to form projections.

11. A rubber track traveling device comprising track rollers, driving sprockets and rubber tracks, each of the rubber tracks including endless elastic member, core bars embedded in the elastic member with an interval and extending in width directions of the elastic member, and steel cords embedded in the elastic member to surround the core bars circumferentially outwardly, each of said core bars including one driving protrusion formed at the center of the core bar and a pair of track roller traveling surfaces formed on both sides of the driving protrusion, respectively, said central driving protrusion having rounded side edges on opposite sides thereof, said sprocket wheel being a disc-shaped member provided in its outer periphery with a plurality of recesses adapted for engaging the driving protrusion, said recesses being alternately opened toward the outside in both surfaces of the disc-shaped member.

12. A rubber track traveling device comprising track rollers, driving sprockets and rubber tracks, each of the rubber tracks including an endless elastic member, core bars embedded in the elastic member with an interval and extending in width directions of the elastic member, and steel cords embedded in the elastic member to surround the core bars circumferentially outwardly, each of said core bars including an anti-detracking protrusion formed at the center of the core bar, a pair of track roller traveling surfaces formed on both sides of the anti-detracking protrusion of each of said core bars along the anti-detracking protrusion at the inner circumferential surface of the elastic member such that said track roller is rolled on the track roller traveling surfaces of the core bar embedded in the elastic member and a pair of driving protrusions formed at the outside of the track roller traveling surfaces, respectively, said sprocket wheel being a disc-shaped member having a central track roller portion provided with a central groove adapted for engaging with the anti-detracking protrusion and a pair of sprocket wheel portions formed on both sides of the central track roller portion, respectively, and provided at the outer periphery thereof with a plurality of open recesses adapted for engaging the driving protrusions.

13. The rubber track traveling device as set forth in claim 12, wherein each of said driving protrusions having rounded side edges on opposite sides thereof.

* * * * *